(12) United States Patent
Greally (10) Patent No.: US 7,281,340 B2
(45) Date of Patent: Oct. 16, 2007

(54) MEASURING DEVICE (76) Inventor: Seamus Greally, 27 Caragh Green, Naas, County Kildare (IE)

(*) Notice: Subject to any disclaimer, the term of this patent is extended or adjusted under 35 U.S.C. 154(b) by 0 days.

(21) Appl. No.: 10/526,460

(22) PCT Filed: Sep. 10, 2003

(86) PCT No.: PCT/IE03/00121

§ 371 (c)(1),
(2), (4) Date: Mar. 3, 2005

(87) PCT Pub. No.: WO2004/025213

PCT Pub. Date: Mar. 25, 2004

(65) Prior Publication Data
US 2006/0053649 A1 Mar. 16, 2006

(30) Foreign Application Priority Data
Sep. 10, 2002 (IE) ............... S2002/0731

(51) Int. Cl.
G01B 3/10 (2006.01)
(52) U.S. Cl. .......................................... 33/758; 33/770
(58) Field of Classification Search ......... 33/757–760, 33/770
See application file for complete search history.

(56) References Cited

U.S. PATENT DOCUMENTS

| 4,164,334 | A | * | 8/1979 | Rathbun et al. | 33/761 |
| 5,842,284 | A | * | 12/1998 | Goldman | 33/760 |
| 6,101,734 | A | * | 8/2000 | Ten Caat et al. | 33/770 |
| 6,223,446 | B1 | * | 5/2001 | Potter | 33/764 |
| 6,622,396 | B2 | * | 9/2003 | Salazar | 33/758 |
| 6,678,967 | B1 | * | 1/2004 | Jueneman | 33/758 |
| 6,931,753 | B2 | * | 8/2005 | Ryals et al. | 33/758 |

* cited by examiner

Primary Examiner—Yaritza Guadalupe-McCall (57) ABSTRACT

The present invention provides a measuring device comprising a measuring tape, and a coupling hingedly mounted to the free end of the measuring tape, the coupling comprising a first section and a second section, wherein the first section and the second section are substantially perpendicular to one another, the coupling being moveable between a first state in which the first section is disposed substantially parallel to a longitudinal axis of the measuring tape, and a second state in which the second section is disposed substantially parallel to the longitudinal axis of the measuring tape.

11 Claims, 6 Drawing Sheets

MEASURING DEVICE

The present invention relates to a measuring device, in particular a tape measuring device consisting of a tape, preferably flexible, having an improved coupling or tab at a free end thereof, for engaging a point/lip/edge of an object from which a measurement is to be taken.

Prior art tape measuring devices generally comprise a hollow housing and a retractable tape which is wound, coil like, within the housing, and which may be drawn outwardly from the housing through an aperture therein, when a measurement is to be taken. Such measuring devices also generally include a tab-like coupling projecting perpendicularly from the free end of the tape. The coupling is shaped and dimensioned to engage an edge of an object from which measurements are to be taken, in order to prevent the tape from slipping away from the object. This coupling is particularly important for tapes which are spring biased to retract into their housing.

However, the coupling does not always adequately suit the shape of the object with which the coupling is to be engaged, and therefore cannot hook onto it effectively, or cannot achieve a snug fit against the object, due to the shape of the object, thereby preventing an accurate measurement from being taken. Furthermore, it is often necessary to engage the coupling beneath or on the underside of an object, due to the shape of the object, or the required measurement to be taken, thus requiring the tape to be twisted in order to read the measuring indicia printed thereon. For these reasons, the measurements recorded by conventional tape measuring devices are often not wholly accurate.

It is also known to have an alternative end coupling for such measuring tapes, which is T-shaped in profile, and which therefore comprises rigid tabs projecting in perpendicular orientation to the tape, in directions both above and below the tape. However, such a rigid construction results in the coupling being quite large and bulky, and, therefore, reduces the accuracy of measurements taken in, for example, a corner of a room or similar confined spaces.

It is therefore an object of the present invention to mitigate one or more of the problems associated with the prior art.

According to the present invention there is provided a measuring device comprising an elongate member; and a coupling in operative association with the elongate member, the coupling comprising a first section and a second section, wherein the first section and the second section are disposed at a desired position relative to one another, the coupling being adapted to hinge, about an axis which lies substantially parallel to a transverse axis of the elongate member, between a first state in which the first section is disposed substantially parallel to a longitudinal axis of the elongate member, to a second state in which the second section is disposed substantially parallel to the longitudinal axis of the elongate member.

preferably, the axis about which the coupling is hinged lies substantially contiguous with a free end of the elongated member.

Preferably, the first section and the second section are disposed substantially perpendicular to one another.

Preferably, the coupling is secured to the elongate member by means of an anchor.

Preferably, the measuring device comprises a pin arranged to secure the coupling to the anchor, the pin defining the axis about which the coupling is hinged.

Preferably, one or other of the coupling or anchor has a pair of spaced apart collars, while the other of the coupling or anchor has a single collar shaped and dimensioned to be seated between the pair of spaced apart collars, wherein the pin passes through the three collars in order to secure the coupling to the anchor.

Preferably, the coupling is displaceable, in the direction of the longitudinal axis of the elongate member, a distance substantially equal to the thickness of the first section or the second section.

Preferably, the elongate member comprises a tape having measuring indicia thereon.

Preferably, the measuring device comprises a backing plate secured, through the elongate member, to the anchor.

Preferably, a transition from the first section to the second section has a radius of curvature whose centre corresponds to the axis about which the coupling is hinged.

Preferably, the measuring device further comprises a housing into which the elongate member is retractable.

As used herein, the term "elongate member" means any type of elongate, preferably substantially planar, body which can be used to measure the dimensions of an object and comprises any suitable material, including fabric, plastic or light metal, this list not intending to limit the term thereto.

As used herein, the term "coupling" is intented to mean any object which enables one object to be secured or connected to another object, whether temporarily or permanently, and in the present context, enables a measuring tape or the like to be secured to or against an object or surface from which a measurement is to be taken.

As used herein, the term "anchor" is intended to mean an object which is adapted to effect the fastening of one item to another.

As used herein, the term "width" means the minor dimension of the elongate member, generally across a transverse axis thereof, but is not intended to be limited thereto.

Embodiments of the present invention will now be described with reference to the accompanying drawings in which:

FIG. 4 is a plan view of the device, in use, with a panel having a raised lip about the perimeter thereof;

FIG. 5a is a side elevation of the device in the first state, in use, with a box;

FIG. 5b is a side elevation of the device in the second state, in use, with the box of FIG. 5a;

Figure 1:
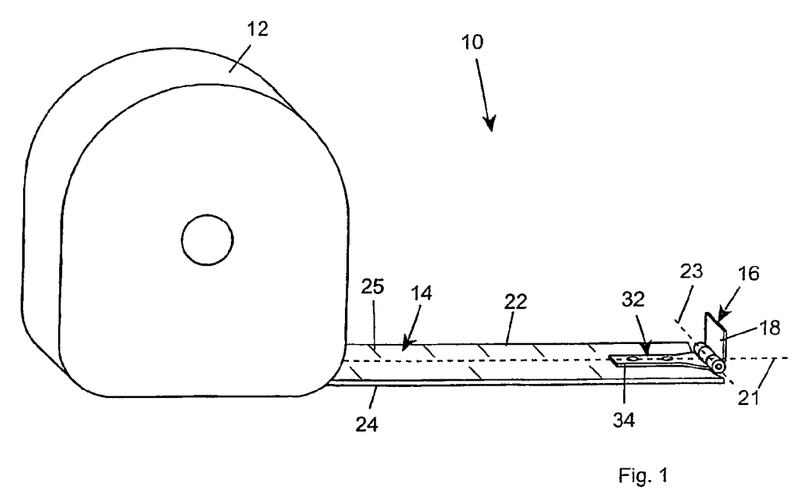
FIG. 1 is a perspective view of a first embodiment of a measuring device according to the invention, comprising a conventional housing and a retractable tape dispensable therefrom, in addition to a coupling hingedly mounted to an otherwise free end of the tape.
Figure 2:
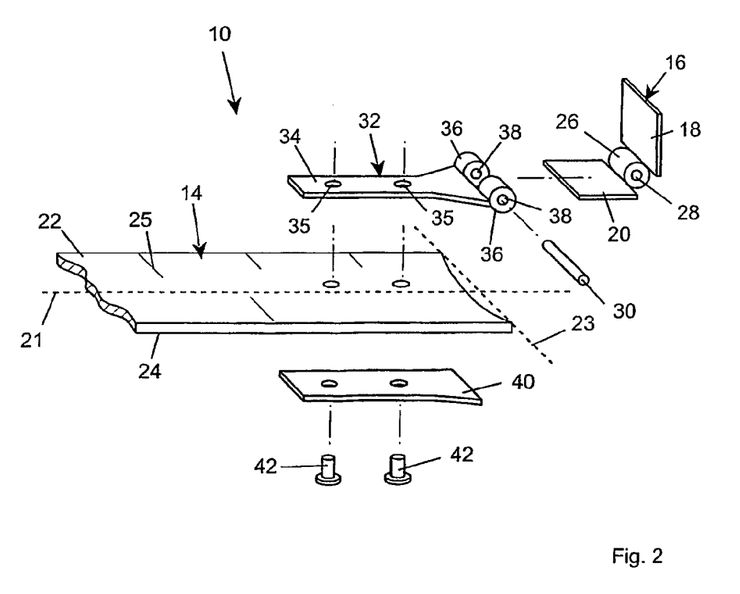
FIG. 2 is an exploded perspective view of a portion of the tape and the coupling of FIG. 1.

Referring now to FIGS. 1 to 5 of the accompanying drawings, there is illustrated a first embodiment of a measuring device according to the invention, generally indicated as 10, for use in taking measurements along or from an object (not shown) or the like. The device 10 comprises an elongate member in the form of a retractable measuring tape 14 which protrudes, in use, from a tape housing 12, and a coupling 16 hingedly mounted to an otherwise free end of the tape 14. The coupling 16 comprises first and second sections forming, respectively, a first arm 18 and a second arm 20, which arms 18, 20 are mounted substantially perpendicular to one another, as shown in FIG. 2. The positions of the arms 18, 20 are fixed relative to one another such that, regardless of the position of one of the arms 18, 20 relative to the tape 14, the other of the arms 18, 20 will be disposed perpendicularly to the other arm 18, 20.

The coupling 16 is hinged, and therefore pivotable, about an axis which lies substantially perpendicular to a longitudinal axis 21, and parallel to a transverse axis 23, of the tape 14. Thus the coupling 16 is pivotable between a first state and a second state, in both of which states one of the arms 18, 20 extends in a direction substantially perpendicular to the tape 14, the other arm 18, 20 being seated substantially in register with the tape 14, generally lying flush thereagainst. In this manner, the coupling 16 enables either the first arm 18 or the second arm 20 to engage, and preferably grip or hook onto, an edge of an object (not shown) from which a measurement is to be taken. The coupling 16 is also pivotable such that an infinite range of positions intermediate the first and second states is obtainable, which will be described in more detail hereinafter.

Figure 3A:
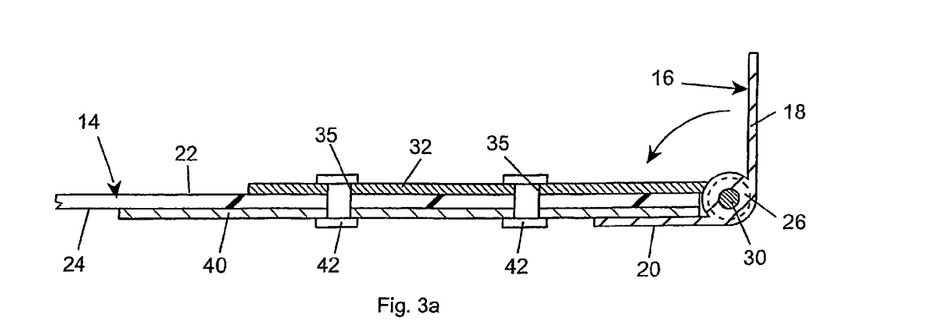
FIG. 3a is a sectioned side elevation of a portion of the tape and the coupling, in use, in a first state.

Referring now to FIG. 1, the tape housing 12 is of the type known in the art used to house a roll of the measuring tape 14, and will generally be formed from plastic or the like, possibly being provided with a resilient covering (not shown) formed from rubber or the like, in order to shield the device 10 from impacts. Within the housing 12, the retractable tape 14 is biassed towards its rolled up state by conventional biassing means (not shown), for example a coil spring (not shown) or the like. When not in use, the coupling 16 located at the end of the tape 14 abuts against the housing 12, and is preferably partially housed therein. In use, a user pulls on the coupling 16 to dispense the tape 14 from the housing 12, through a slot like aperture (not shown) provided therein, as with conventional prior art measuring devices (not shown). The tape 14 will generally be formed from thin metal, and may be slightly concave across the width thereof, in order to provide rigidity to the tape 14 when a substantial length thereof has been dispensed from the housing 12. However, it will be appreciated that any other suitable material may be used for the tape 14, for example a fabric or the like, although it is preferable that the material chosen embodies a degree of flexiblity, in order to allow the tape 14 to be resiliently deformed, and returned to normal without damage thereto. As shown in FIG. 3a, the tape 14 therefore comprises an upper surface 22 and a lower surface 24, with the upper surface 22 being provided with measuring indicia 25 along the length thereof. The lower surface 24 may also be provided with measuring indicia, possibly of a different scale, although this will not generally be the case. Alternatively, the measuring device 10 could be provided with an electronic counter (not shown) operable to determine the exact length of the tape 14 which has been dispensed from the housing 12, and to display the measurment on a display (not shown) on the housing 12, or transmit the measurement, by conventional electronic means, to a computer (not shown) or the like. It will therefore be appreciated that, although preferred, the measuring indicia 25 are not essential to the operation of the invention.

Referring now to FIG. 2 in particular, the first and second arms 18, 20 are preferably substantially planar, and rectangular in shape, the first arm 18 being disposed substantially perpendicular to the second arm 20. Each arm 18, 20 is preferably formed from a metal or similar material, in order to provide rigidity and wear resistance thereto, in order to ensure the continued accuracy of measurements taken with the device 10. The first and second arms 18, 20 are hingedly mounted to the tape 14 by means of a conventional pin and collar arrangement. The pin and collar arrangement comprises a first cylindrical collar 26 mounted between the arms 18, 20, thereby forming a transition between the arms 18, 20, and a pair of spaced apart cylindrical collars 36 mounted to the tape 14, as will be described in detail hereinafter. The pair of collars 36 are shaped and dimensioned to receive the first collar 26 therebetween. The first collar 26 is provided with a centrally disposed aperture 28 therein, while each of the pair of collars 36 is provided with a correspondingly positioned aperture 38 therein, which are therefore aligned with the aperture 28 when the first collar 26 is disposed between the pair of collars 36.

A pin 30 is therefore located within the apertures 28, 38, thereby securing the coupling 16 to the tape 14. The arrangement is preferably such that an interference fit is provided between the pin 30 and the apertures 38, thereby securing the pin 30 in place, while the aperture 28 is dimensioned to provide a slip fit with the pin 30, allowing the coupling 16 to hinge freely about the pin 30, and therefore the end of the tape 14. It will of course be appreciated that any other suitable means of retaining the pin 30 in place could be used, for example by threading one or both ends of the pin 30, and providing one or both of the collars 38 with a corresponding thread (not shown).

In this first embodiment, the pair of collars 36 form part of an anchor in the form of a plate 32, which plate 32 is fastened to the tape 14, as will be described, in order to enable the coupling 16 to be hingedly mounted to the tape 14. The plate 32 has a substantially rigid, planar body 34 having a pair of apertures 35 therein, which apertures 35 therefore permit the plate 32 to be secured against the upper surface 22 of the tape 14, preferably by means of a pair of rivets 42. A backing plate in the form of a substantially rigid, planar reinforcing portion 40 is also provided against the lower surface 24 of the tape 14. The pair of rivets 42 also pass through this reinforcing portion 40, thereby reducing the possibility of the pair of rivets 42 being pulled through the tape 14 if too great a load is placed on the coupling 16 via the tape 14. It will however be appreciated that although the reinforcing portion 40 is advantageous in this regard, in addition to providing the tape 14 with increased rigidity, it is not essential to the operation of the invention, and is merely a preferred feature.

Figures 4, 5A, 5B:
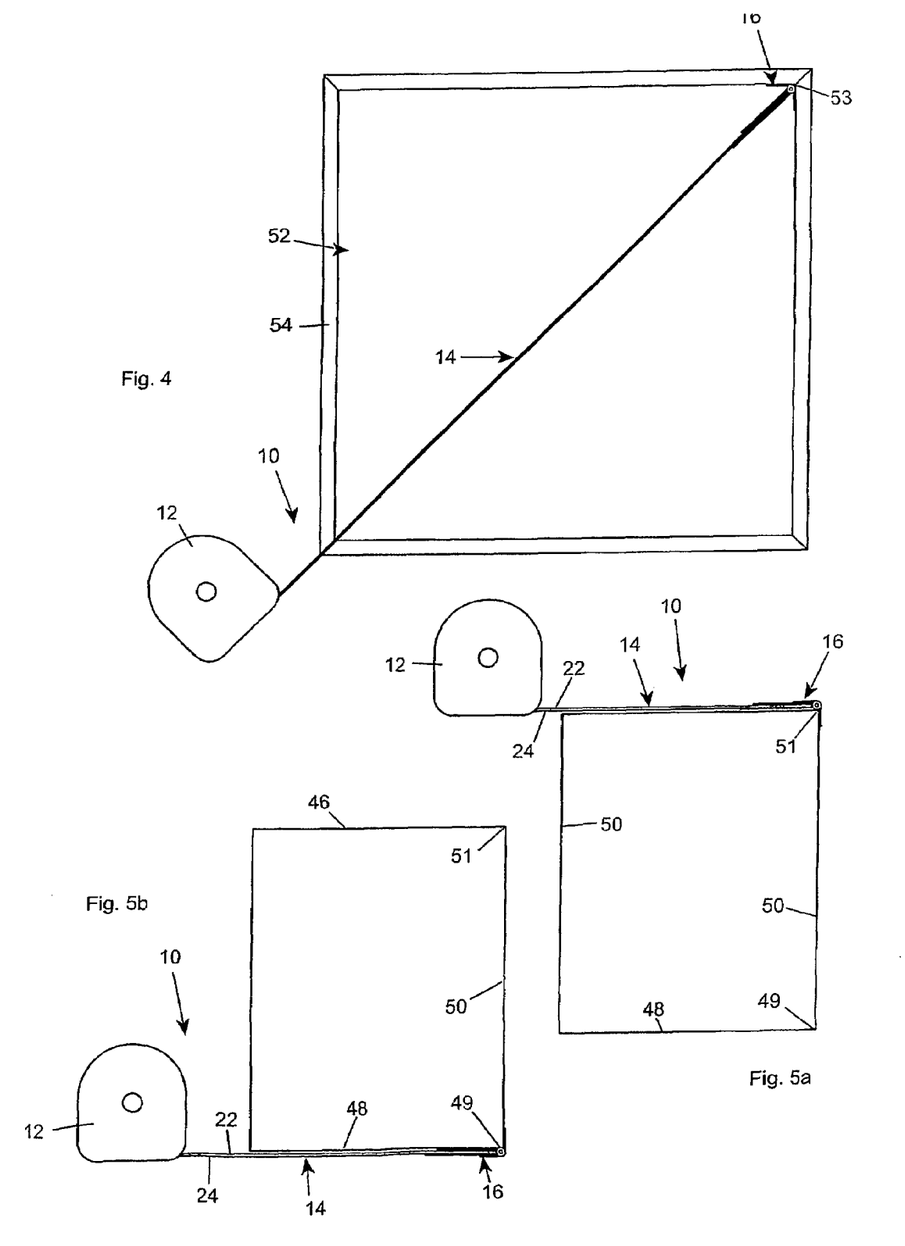

Although not shown in FIG. 3a, the apertures 35 provided in the plate 32 are preferably elongate in form. The coupling 16 may therefore be displaced about the rivets 42, in a direction along the longitudinal axis 21 of the tape 14, by a distance approximately equal to the thickness of the first arm 18 or the second arm 20, thereby resulting in a corresponding displacement of the coupling 16. Such sliding movement of the coupling 16 enables the measuring device 10 to compensate for the thickness of the respective arm 18, 20 in any measurement in which either arm 18, 20 abuts against a surface (not shown) from which a measurement is to be taken, for example as illustrated in FIG. 4. This provision is well known in conventional prior art tape measuring devices (not shown).

Figure 3B:
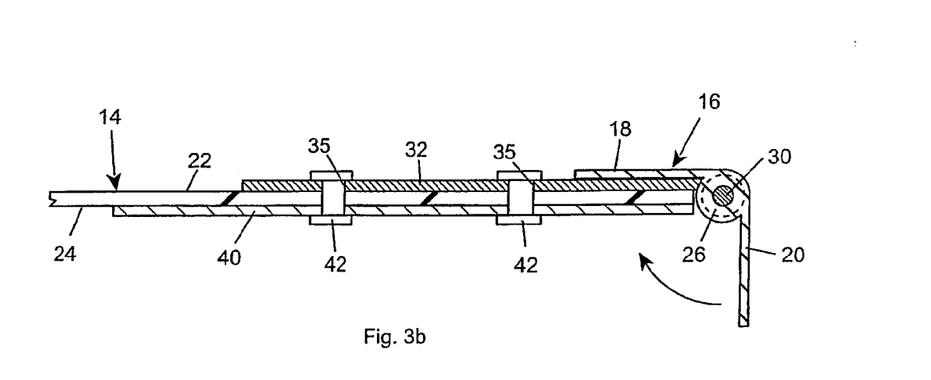
FIG. 3b is a sectioned side elevation of the tape and the coupling, in use, in a second state, showing the coupling of FIG. 3a having been rotated through 90 degrees in an anti-clockwise direction.

Referring now to FIGS. 3a and 3b, the coupling 16 is pivotable, in use, about an axis defined by the pin 30. FIG. 3a shows the coupling 16, in use, in a first state, the first arm 18 extending in a direction substantially perpendicular to the upper surface 22, the second arm 20 lying in the plane of the tape 14, in register with the lower surface 24 as hereinbefore described. The coupling 16 is pivotable about the pin 30 to a second state, as shown in FIG. 3b. In this second state, the first arm 18 lies in the plane of the tape 14, substantially in register with the upper surface 22, the second arm 20 extending in a direction substantially perpendicular to the lower surface 24 as hereinbefore described.

The coupling 16 is therefore constructed and adapted such that either the first arm 18 or the second arm 20 is used to engage and hook onto an object (not shown) from which a measurement is to be taken. This is illustrated, for example, in FIGS. 5a and 5b, which show a box 44 comprising an upper end 46 and a lower end 48 connected by two sides 50. Referring to FIG. 5a, the tape 14, in use, is dispensed from the housing 12 and placed flush against the upper end 46 of the box 44, in order to measure same. The coupling 16 is placed in the second state, such as to be capable of engaging a corner 51 between the upper end 46 and the side 50 adjacent thereto. In this state, the second arm 20 is used to hook onto the box 44, and the upper surface 22 of the tape 14 is easily readable to provide an accurate measurement of the upper end 46.

The versatility of the device 10 is illustrated in FIG. 5b, in which the tape 14 is placed flush against the lower end 48 of the box 44. The coupling 16 is now hinged into the first state, i.e. rotated through 90 degrees from the second state, and is therefore now capable of engaging a corner 49 between the lower end 48 and the side 50 adjacent thereto. In this manner, the first arm 18 is used to hook onto the box 44. The upper surface 22 of the tape 14 is again easily readable, thus avoiding any twisting of the tape 14 in order provide an accurate measurement of the lower end 48.

Figure 3C:
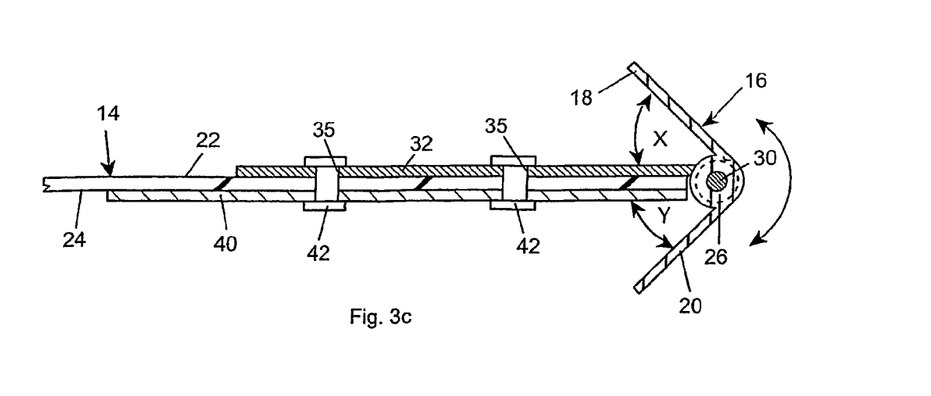
FIG. 3c is a sectioned side elevation of the tape and the coupling, in use, in an alternative state, intermediate the first and second states, of FIGS. 3a and 3b respectively.

FIG. 3c shows the coupling 16 in a position intermediate the first and second states, in which the first arm 18 defines a first acute angle (X) of approximately 45° with the upper surface 22, while the second arm 20 defines a second acute angle (Y) of approximately 45° with the lower surface 24. It will be appreciated that the coupling 16 is pivotable about the pin 30 such that the first angle (X) is variable from 0–90°, and the second angle (Y) is also variable from 0–90°, such that the sum of the first and second angles (X), (Y) is always approximately 90°. Therefore if, for example, the first angle (X) is approximately 20°, the second angle (Y) will be approximately 70°.

Referring now to FIG. 4, the device 10 is shown, taking a measurement across a diagonal of a panel 52 having a raised lip 54 about the perimeter thereof. The coupling 16 is constructed to allow the accurate measurement, in particular, of the internal diagonal dimensions of the panel 52. In particular, the coupling 16 abuts squarely within a corner 53 of the panel 52, to provide accurate diagonal measurement of the panel 52. If the coupling 16 were not pivotable on the free end of the tape 14, one or other of the arms 18, 20 would serve as an impediment to the snug fit of the coupling 16 into the corner 53. If the coupling 16 could not be seated tight within the corner 53, the measurement taken from the corner 53 to any other point would be inaccurate, giving a reading slightly less than the actual length in question. Thus the device 10 is particularly useful where accurate interior measurements are required. It will of course be appreciated that the device 10 can also be used to measure the external dimensions of the panel 52, using the coupling 16 in the first and second states, as previously described hereinbefore.

When the device 10 is being used in this manner, with the coupling 16 abutting against an object or surface (not shown), it is preferable that the distance from the end of the tape 14, along the longitudinal axis 21, to the point of contact between the coupling 16 and the object or surface (not shown) from which the measurement is being taken, is constant regardless of the angular orientation of the coupling 16 relative to the tape 14. For this reason each of the arms 18, 20 should extend tangentially from the collar 26, as can be seen in FIG. 3, while the collar 26 should have a constant radius. In this way, altering the position of the coupling 16 relative to the tape 14 will not affect the accuracy of the measurement taken.

Referring now to FIGS. 6 to 9, there is illustrated a second embodiment of a measuring device according to the present invention, generally indicated as 110, in which like components have been accorded like reference numerals, and unless otherwise stated, perform a like function. The measuring device 110 again comprises a housing 112 from which may be dispensed an elongate member in the form of a retractable tape 114 having measuring indicia 125 thereon. Hingedly mounted to the free end of the tape 114 is a coupling 116, which again comprises a first section 118 and a second section 120, disposed perpendicularly to one another. The coupling 116 is pivotable about an axis which lies substantially parallel to a transverse axis 123 of the tape 114, such that the first section 118 may be disposed substantially flush with an upper surface 122 of the tape 114, or such that the second section 120 may be disposed substantially flush with a lower surface 124 of the tape 114.

Figure 6:
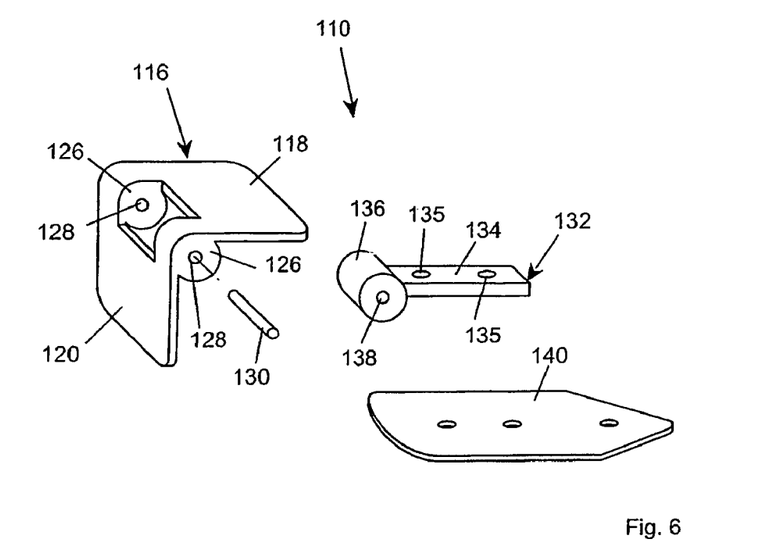
FIG. 6 illustrates an exploded perspective view of a coupling and anchor forming part of a second embodiment of a measuring device according to the invention.
Figure 7:
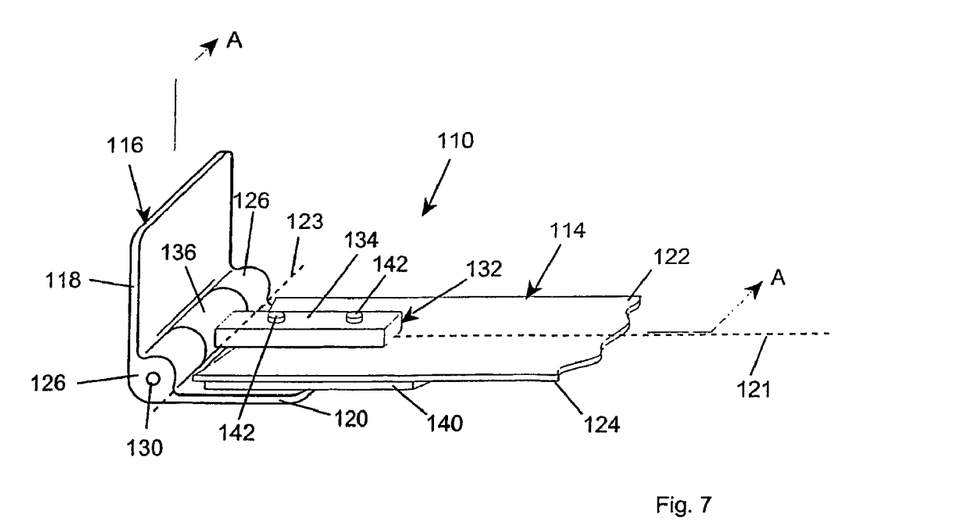
FIG. 7 illustrates a perspective view of the second embodiment of the invention.
Figure 8:
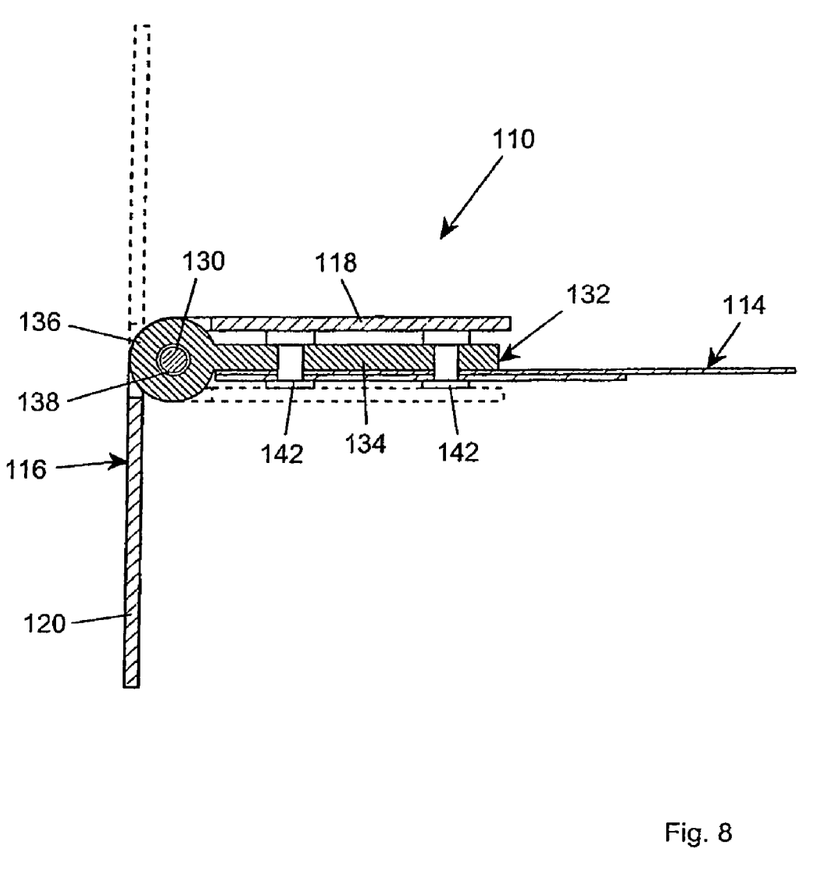
FIG. 8 illustrates a sectioned side elevation, taken along the line A—A, of the measuring device of FIG. 7.
Figure 9:
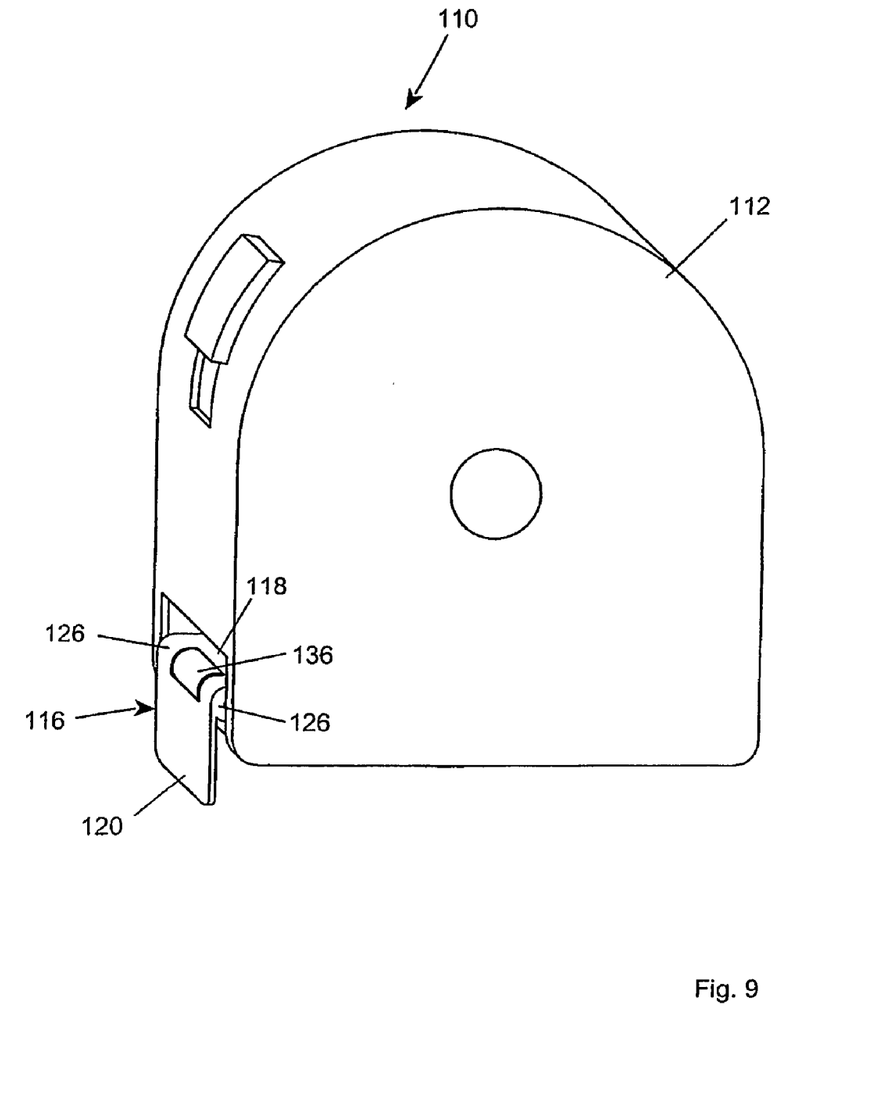
FIG. 9 illustrates a perspective view of the measuring device of the second embodiment, fully retrated within a housing thereof.

The coupling 116 includes a pair of oppositely disposed collars 126, which in the embodiment illustrated, are formed integrally with the first section 118 and the second section 120. As with the device 10 of the first embodiment, the first section 118 and the second section 120 each extend tangentially from the pair of collars 126, which collars 126 have a constant radius, to ensure accurate measurements regardless of the orientation of the coupling 116. Each collar 126 defines an aperture 128 which, in use, receive a pin 130, which is utilised to secure the coupling 116 to the tape 114. Thus, the measuring device 110 further includes an anchor in the form of a plate 132 which is secured adjacent the free end of the tape 114, as will be described hereinafter in detail, to which plate 132 the coupling 116 is secured. The plate 132 comprises an body 134 having a pair of elongate apertures 135 therein to facilitate fastening to the tape 114, and a cylindrical collar 136 projecting from the end of the body 134. The collar 136 is provided with a bore 138 therethrough, which corresponds in diameter to the pin 130, the collar 136 being shaped and dimensioned to sit between the pair of collars 126, the pin 130 passing through the bore 138 in order to secure the coupling 116 to the plate 132.

The pin 130 preferably has an interference fit with the bore 138, while having a sliding fit within each aperture 128, such that the pin 130 will be held secure within the collar 136, while the coupling 116 will be free to pivot on the pin 130, in order to allow the coupling 116 to function as described above.

The plate 132 is secured to the tape 114 by means of a pair of rivets 142, which pass through the apertures 135 in the body 134. In order to reinforce this fastening, a backing plate in the form of a reinforcing portion 140 may be provided against the lower surface 124 of the tape 114, through which the rivets 142 also pass.

In order to allow the coupling 116 to be displaced relative to the tape 114, in a direction along a longitudinal axis 121 thereof, as with most conventional measuring tapes (not shown), and as described with reference to the device 10 of the first embodiment, the pair of apertures 135 are elongate in nature, thereby allowing the plate 132 to slide back and forth, with the rivets 142 acting to limit this movement to the length of the apertures 135.

According to an alternative embodiment (not shown), the coupling 16; 116 may be constructed such that the first arm 18; 118 is mounted at an acute angle to the second arm 20; 120. According to a still further embodiment (not shown), the first arm 18; 118 may be mounted at an obtuse angle to the second arm 20; 120. In this manner, it will be apparent that a variety of measuring devices (not shown) may be produced, having a range of angled couplings (not shown). Furthermore, the devices (not shown) may be further adapted such the first arm 18; 118 is moveable relative to the second arm 20; 120, thus providing a variety of couplings 16; 116 and measuring methods.

It will be appreciated that the present invention is not limited to the embodiments described herein. For example, it will be appreciated that the coupling 16; 116 is not limited to being hingedly mounted to the tape 14; 114 by means of the pin and collar arrangement, and that any other suitable means may be used. The pin and collar arrangement previously described herein enables a user (not shown) to move the arms 18; 118, 20; 120 into whatever position enables a particular dimension of an object to be measured. However, the pin and collar arrangement may, for example, be replaced by some form of frictional coupling or bearing (not shown), for example a dimple and nipple arrangement (not shown). Such a dimple and nipple arrangement (not shown) would enable a user to incrementally change the position of the arms 18; 118, 20; 120 by "clicking" the arms 18; 118, 20; 120 into pre-determined positions. Such an arrangement would be particularly useful in making small positioning changes to the anus 18; 118, 20; 120, intermediate the first and second states.

In addition, the coupling 16; 116 could be secured to the tape 14; 114 by a solid yet flexible fastener (not shown), for example a plastic hinge (not shown). Thus the coupling 16; 116 could be formed integrally with the plate 32; 132, with the transition from the coupling 16; 116 to the plate 32; 132 being thin and flexible in order to enable the coupling 16; 116 to be hinged relative to the plate 32; 132. The combined coupling 16; 116 and plate 32; 132 could therefore be moulded, from plastic or the like, as a single piece.

It will be further appreciated that the plate 32; 132 and reinforcing portion 40; 140 are not limited to being secured to the tape 14; 114 by means of the rivets 42; 142, and that any other suitable means may be used.

The present invention therefore provides a measuring device 10; 110 which facilitates the accurate measurement of distances which would otherwise be awkward to undertake, or may due to the shape or location of the site, give inaccurate measurements using conventional measuring devices (not shown).

The invention claimed is:

1. A measuring device comprising an elongate member; and a coupling in operative association with the elongate member, the coupling comprising a first section and a second section, wherein the first section and the second section are rigidly coupled to each other at 90 degrees-relative to one another, the coupling being adapted to rotatably hinge to said elongate member, about an axis which lies substantially parallel to a transverse axis of the elongate member, between a first state in which the first section is disposed substantially parallel to a longitudinal axis of the elongate member, to a second state in which the second section is disposed substantially parallel to the longitudinal axis of the elongate member.

2. A measuring device according to claim 1 wherein the axis about which the coupling is hinged lies substantially contiguous with a free end of the elongate member, while allowing for the inside or the outside surface of the first or second section, and the radius of the coupling to be at a zero point on the scale as required.

3. A measuring device according to claim 1 wherein the first section and the second section are disposed permanently substantially perpendicular to one another.

4. A measuring device according to claim 1 wherein the coupling is secured to the elongate member by means of an anchor, which forms the inner part of a hinge to the coupling.

5. A measuring device according to claim 4 comprising a pin arranged to secure the coupling to the anchor, the pin defining the axis about which the coupling is hinged, and the centre point of a radius between the first section and the second section.

6. A measuring device according to claim 5 in which one or other of the coupling or anchor has a pair of spaced apart collars, while the other of the coupling or anchor has a single collar shaped and dimensioned to be seated between the pair of spaced apart collars, wherein the pin passes through the three collars in order to secure the coupling to the anchor.

7. A measuring device according to claim 4 further comprising a backing plate secured, through the elongate member, to the anchor.

8. A measuring device according to claim 1 wherein the coupling is displaceable, in the direction of the longitudinal axis of the elongate member, a distance substantially equal to a first state wherein the first section is 90 degrees above the elongate member to a second state where the second section is 90 degrees below the elongate member.

9. A measuring device according to claim 1 wherein the elongate member comprises a tape having measuring indicia thereon.

10. A measuring device according to claim 1, with a 90 degree coupling, wherein a transition from the first section to the second section has a radius of curvature whose centre corresponds to the axis about which the coupling is hinged.

11. A measuring device according to claim 1, further comprising a housing into which the elongate member is retractable.

* * * * *